United States Patent Office
3,282,925
Patented Nov. 1, 1966

3,282,925
ENAMINE DERIVATIVES OF 3-AZABICYCLO-
[3.2.2]NONANE
Vada L. Brown, Jr., and Theodore E. Stanin, Kingsport,
Tenn., assignors to Eastman Kodak Company, Rochester, N.Y., a corporation of New Jersey
No Drawing. Filed Feb. 27, 1964, Ser. No. 347,699
4 Claims. (Cl. 260—239)

This invention relates to new chemical compounds and more particularly to novel enamine derivatives of 3-azabicyclo[3.2.2]nonane.

This is a continuation-in-part of our copending application Serial No. 205,866, filed June 28, 1962, now abandoned.

The synthesis of 3-azabicyclo[3.2.2]nonane is described in the patent application of Brown, Smith and Stanin, Serial No. 82,373, filed January 13, 1961, now abandoned and in the continuation-in-part thereof, Serial No. 196,494, filed May 21, 1962. The compound can be prepared by the catalytic deamination of 1,4-cyclohexanebis(methylamine) in vapor phase. The procedure comprises feeding 1,4-cyclohexanebis(methylamine) with nitrogen at a constant rate through a heated catalyst bed, e.g., catalytic alumina, at a temperature of 350 to 450° C.

The compounds of the invention are enamines that are N-alkenyl derivatives of 3-azabicyclo[3.2.2]nonane, such derivatives being of the following general formulae:

(I) 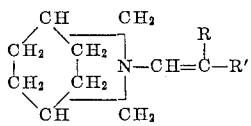

wherein R and R' are lower alkyl groups, or are lower alkylene groups which, with the carbon atom to which they are attached, form a cycloalkylidene radical and (II) 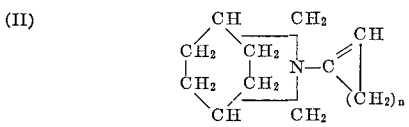

wherein n is an integer from 2–4, i.e., cyclobutenyl, cyclopentenyl and cyclohexenyl.

The compounds of structural Formula I may be prepared by reacting 3-azabicyclo[3.2.2]nonane with an aliphatic aldehyde having one alpha-hydrogen atom, i.e., an aldehyde of the type, RR'CHCHO, wherein R and R' are the same or different lower alkyl groups such as methyl, ethyl, propyl or butyl radicals. R and R' can also be lower alkylene radicals which, with the carbon atom to which they are attached, form a bivalent saturated, carbocyclic ring, i.e., a cycloalkylidene radical, of about 4 to 6 carbon atoms. The reaction can be carried out suitably by heating under reflux approximately equimolar proportions of the reactants, preferably with a slight excess of the aldehyde, and preferably in the presence of a water entrainer such as benzene. Examples of suitable aldehydes include isobutyraldehyde, 2-methylbutanal, 2-ethylhexanal, cyclobutanecarboxaldehyde, cyclopentanecarboxaldehyde, cyclohexanecarboxaldehyde, etc.

The reaction can be represented by the following equation:

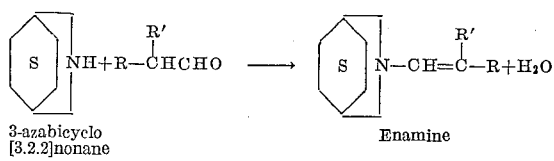

The compounds of structural Formula II may be prepared by reacting 3-azabicyclo[3.2.2]nonane with a cyclic ketone having the structural formula:

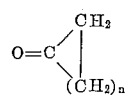

wherein n is an integer from 2–4.

The reaction can be represented by the following equation:

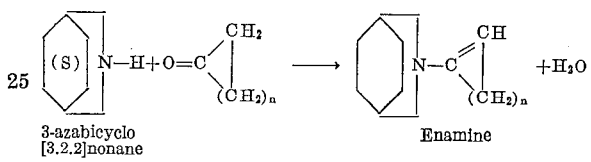

The preparation of compounds in accordance with the invention is illustrated by the following examples.

Example 1

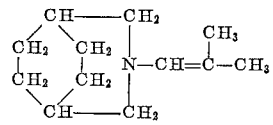

3-(2-methylpropenyl)-3-azabicyclo[3.2.2]nonane

A solution of 125 g. (1.0 moles) of 3-azabicyclo[3.2.2]nonane in 200 cc. of benzene was charged to a 500 cc. three-neck flask, equipped with a condenser, stirrer, thermometer, and Dean-Stark tube. Stirring was started and 100 g. (1.38 moles) of isobutyraldehyde was added over a 10 minute period. The reaction mixture was then heated to reflux and water removed as it formed in the Dean-Stark tube. After 8.75 hours, the reaction had been completed, with the removal of 18.5 cc. of water. The reaction product was concentrated and the residual oil distilled in vacuo to yield 152.2 g. (85%) of 3-(2-methylpropenyl) - 3 - azabicyclo[3.2.2]nonane, B.P. 67–68° C. (0.8 to 1.0 mm.).

Analysis.—Calcd. for C, 80.46%; H, 11.72%; N, 7.82%. Found: C, 80.37%; H, 11.83%; N, 7.84%; $n_D^{20}$ 1.5008.

Example 2

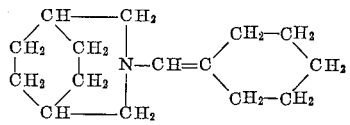

3-(cyclohexylidenemethyl)-3-azabicyclo[3.2.2]nonane

A solution of 112.2 g. (0.91 mole) of 3-azabicyclo[3.2.2]nonane in 175 ml. of benzene was charged to a one (1) liter three-necked flask, equipped with a condenser, stirrer, thermometer, and Dean-Stark tube. Stirring was started and 112 g. (1.0 mole) of cyclohexanecarboxyaldehyde was added over a 31 minute period. The reaction mixture was then heated to reflux and water removed as it formed in the Dean-Stark tube. After one and one-half hours, the reaction had been completed, with the removal of 16.5 ml. of water. The reaction product was concentrated and the residual oil distilled in vacuo to yield 158.8 g. (80.5%) of 3-(cyclohexylidenemethyl)-3-azabicyclo[3.2.2]nonane, B.P. 168–173° C. (2.6–2.8 mm.).

*Analysis.*—Calcd. for C, 82.27%; H, 11.41%; N, 6.39%. Found: C, 81.82%; H, 11.69%; N, 6.31%; $n_D^{20}$ —1.5257.

*Example 3*

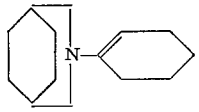

3-(1-cyclohexen-1-yl)-3-azabicyclo[3.2.2]nonane

A solution of 1.25 g. (1.0 mole) of 3-azabicyclo-[3.2.2]nonane in 200 ml. of benzene was charged to a one (1) liter, three-necked flask, equipped with a condenser, stirrer, thermometer, and Dean-Stark tube. Stirring was started and 108 g. (1.1 moles) of cyclohexanone was added over a 15-minute period. The reaction mixture was then heated to reflux and water removed as it formed in the Dean-Stark tube. After 14 hours and 45 minutes, the reaction had been completed. The reaction product was concentrated and the residual oil distilled in vacuo to yield 124 g. (60.5%) of 3-(1-cyclohexen-1-yl)-3-azabicyclo[3.2.2]nonane, B.P. 88–92° C. (0.4–0.9 mm.).

*Analysis.*—Calcd. for C, 81.96%; H, 11.21%; N, 6.83%. Found: C, 81.91%; H, 11.29%; N, 7.1%; $n_D^{20}$ 1.5388.

The novel compounds of our invention are useful as chemical intermediates. They are reactive enamines of structural Formula I above having no beta-hydrogens and undergo cycloaddition reactions with compounds having olefinic unsaturation in the manner illustrated by Hasek and Martin, J. Org. Chem., 26, 4775 (1961) and Brannock, J. Org. Chem., 26, 625 (1961), to form useful tertiaryamino-substituted cyclobutane derivatives. An example is the reaction of our novel enamines with dimethylketene to obtain tertiaryamino-substituted cyclobutanones. The latter can be reduced to tertiaryaminocyclobutanols having utility as dye intermediates, fuel oil stabilizers and as pharmaceuticals or as intermediates for pharmaceuticals.

Another valuable type of derivative is obtained by causing the reaction of an enamine of structural Formula I with an alkyl ester of an acrylic acid. This yields a carbalkoxy-substituted cyclobutane derivative which in turn can be reduced to a tertiaryamino-substituted cyclobutane methanol, the latter having similar utility to that of the above-mentioned cyclobutanols. The next example illustrates the preparation of such a derivative of the product of Example 2.

*Example 4*

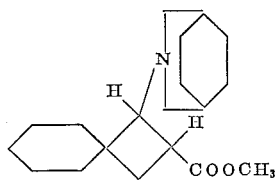

Methyl 1-(3-azabicyclo[3.2.2]non-3-yl)spiro[3.5]nonane-2-carboxylate

To a one (1) liter, three-necked flask equipped with stirrer, condenser, and thermometer was added 109.5 g. (0.5 mole) 3-cyclohexylidenemethyl-3-azabicyclo[3.2.2]-nonane, 53.4 g. (0.6 mole) methyl acrylate, 0.5 g. hydroquinone, and 225 g. of acetonitrile. The reaction mixture was then heated with stirring at reflux for eight hours. After eight hours at reflux, the solvent (acetonitrile) was removed by distillation in vacuo to yield 64 g. (42%) of methyl 1-(3-azabicyclo[3.2.2]non-3-yl)spiro[3.5]nonane-2-carboxylate. Crystallization of the crude from toluene-methyl alcohol yielded a product with a M.P. 88–90° C.

*Analysis.*—Calcd. for C, 74.77%; H, 10.16%; N, 4.59%. Found: C, 74.95%; H, 10.42%; N, 4.37%.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A compound from the group represented by the following formulae:

(I)
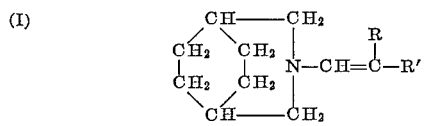

wherein R and R' are selected from the group consisting of (a) lower alkyl and (b) lower alkylene which, with the carbon atom to which they are attached, form cycloalkylidene of about 4 to 6 carbon atoms and (II)
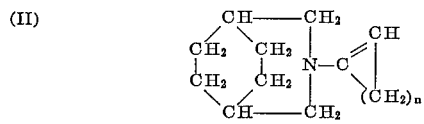

wherein *n* is an integer from 2 to 4.

2. 3-(2-methylpropenyl)-3-azabicyclo[3.2.2]nonane.
3. 3 - (cyclohexylidenemethyl) - 3 - azabicyclo[3.2.2]nonane.
4. 3-(1-cyclohexen-1-yl-)-3-azabicyclo[3.2.2]nonane.

No references cited.

JOHN D. RANDOLPH, *Primary Examiner.*